United States Patent [19]

Sweeny

[11] Patent Number: 4,782,131
[45] Date of Patent: Nov. 1, 1988

[54] ESTER INTERCHANGE POLYESTER PREPARATION WITH ALKALI METAL FLUORIDE CATALYST

[75] Inventor: Wilfred Sweeny, Wilmington, Del.

[73] Assignee: E. I. Du Pont De Nemours and Company, Wilmington, Del.

[21] Appl. No.: 67,117

[22] Filed: Jun. 29, 1987

[51] Int. Cl.$^4$ .............................................. C08G 63/14
[52] U.S. Cl. .................................... 528/180; 528/125; 528/126; 528/176

[58] Field of Search ................................. 528/180, 126

[56] References Cited

FOREIGN PATENT DOCUMENTS 021114 9/1969 Japan .
090829 7/1981 Japan .

Primary Examiner—Harold D. Anderson

[57] ABSTRACT

Polyester formation is catalyzed by an alkali metal fluoride other than lithium fluoride.

9 Claims, No Drawings

ESTER INTERCHANGE POLYESTER PREPARATION WITH ALKALI METAL FLUORIDE CATALYST

BACKGROUND OF THE INVENTION

The transesterification reaction between ethylene glycol and dimethyl terephthalate and polycondensation of the product in the presence of lead fluoride is taught in U.S. Pat. No. 3,457,239.

Yttrium compounds, including yttrium fluoride, have been disclosed in U.S. Pat. No. 3,523,104 as catalysts for the polyesterification of the reaction product of a dicarboxylic acid or ester-forming derivative thereof with a glycol.

A combination of manganese and lithium compounds have been used as ester-interchange reaction catalysts to prevent scale formation in the production of polyesters from a dialkyl ester of terephthalic acid and a glycol according to U.S. Pat. No. 4,057,534.

Finally, the fluoride-promoted esterification of carboxylic acids, usually by their reaction with alkyl halides, is discussed in a review article by J. N. Clark-*Chemical Review*, 1980, 80, 429–452.

SUMMARY OF THE INVENTION

This invention provides an improved process for preparing polyester from at least one aromatic diol and at least one diphenylester of an aromatic dicarboxylic acid and/or at least one phenyl ester of a hydroxyaromatic acid which comprises subjecting the reactant(s) to an ester interchange reaction in the presence of a catalytic amount of an alkali metal fluoride selected from the group of cesium, rubidium, potassium and sodium fluorides.

DETAILED DESCRIPTION OF THE INVENTION

The process of the invention involves a catalyzed ester interchange reaction between at least one aromatic diol and at least one diphenylester of an aromatic dicarboxylic acid and/or at least one phenyl ester of a hydroxyaromatic acid. Thus, the reaction may be between one or more aromatic diols and one or more diphenylesters of aromatic dicarboxylic acids or the reaction mixture may include one or more phenyl esters of hydroxyaromatic acids or it may involve only phenyl esters of hydroxyaromatic acids. If it is desired to provide some degree of branching in order to modify processing characteristics of the polymer, one may include a small amount of a phenyl ester of an aromatic tricarboxylic acid, such as phenyl trimesate. This component should be added in an amount which will not cause gelling or cross-linking. The resulting polyesters are useful for molding resins, fibers and/or films.

By "aromatic" diols, dicarboxylic acids or hydroxyacids is meant that the functional group or groups, i.e., hydroxyl or carboxyl, is attached directly to an aromatic ring.

Exemplary aromatic diols include hydroquinone, phenylhydroquinone, t-butylhydroquinone, resorcinol, 4,4'-isopropylidene diphenol (Bisphenol "A"), 4,4'-diphenol and 3,4'-dihydroxybenzophenone. Diphenylesters that are suitable include diphenyl terephthalate and diphenyl isophthalate as well as those containing substituent groups, such as lower alkyl or chloro. Dialkyl esters are unsuitable for the instant catalytic reaction. Phenyl esters of hydroxyaromatic acids that are useful include phenyl 4-hydroxybenzoate and phenyl 2,6-hydroxynaphthoate.

The catalyst component is an alkali metal fluoride such as cesium fluoride, rubidium fluoride, potassium fluoride or sodium fluoride. Lithium fluoride is unsatisfactory. Cesium and potassium fluorides are preferred catalysts. The catalyst is employed in an amount sufficient to catalyze the reaction, but preferably should not exceed 0.1% by wt. based on the total reactants.

The reaction conditions for ester interchange are well known in the art (see Advances In Polymer Science, V. 43, Publ. Springer-Verlag, New York, 1982). The examples below illustrate a variety of conditions and materials that have been employed in practice of the invention.

TEST MEASUREMENTS

Inherent viscosity is measured in pentafluorophenol (PFP) or in 1,1,2,2-tetrachloroethane and is reported in deciliters per gram (dl/g.).

The following examples are illustrative of the invention and are not to be construed as limiting.

EXAMPLE 1

Polyester from Phenylhydroquinone, Diphenyl Terephthalate and Diphenyl Isophthalate Via Ester Exchange Polymers with the ingredient composition phenylhydroquinone/diphenyl terephthalate/diphenyl isophthalate 50/45/5 in mole percent were prepared with and without CsF catalyst for the ester exchange reaction.

| | Weight | |
| --- | --- | --- |
| Ingredient | Example 1 | Comparative Example 1A |
| Phenylhydroquinone | 9.3 g (0.05 mole) | 9.3 g |
| Diphenyl terephthalate | 14.3 g (0.045 mole) | 14.3 g |
| Diphenyl isophthalate | 1.6 g (0.005 mole) | 1.6 g |
| CsF | 0.03 g (0.0002 mole) | — |

The above mixtures were placed in three-necked reaction vessels each fitted with a mechanical stirrer, a gas inlet tube and a distillation head. After purging with argon, the reaction vessels were placed in a Woods metal bath at 340° C. The polymerization proceeded as follows:

| Example 1 | | Comparative Example 1A | |
| --- | --- | --- | --- |
| Time (min) | Event | Time (min) | Event |
| 0 | Started | 0 | Started |
| 2 | 1st drop of phenol | 12 | 1st drop of phenol |
| 30 | 5 ml phenol evolved Applied vacuum (0.4 mm) | 60 | 3.8 ml phenol evolved Applied vacuum(0.4 mm) |
| 60 | Stopped reaction | 90 | Stopped reaction |

The polymer from Example 1 formed a viscous melt which could be melt spun into fiber. The polymer appeared fibrous when cooled. Polymer inherent viscosity in PFP was 1.65 dl/g. The polymer from Comparative Example 1A was a brittle glass.

EXAMPLE 2

Polyester from 3,4'-Dihydroxybenzophenone, Diphenyl Terephthalate and Diphenyl Isophthalate A polymer with the ingredient composition 3,4'-dihydroxybenzophenone/diphenyl terephthalate and diphenyl isophthalate 50/45/5 in mole percent was prepared using KF as a catalyst for the ester exchange.

| Ingredient | Weight |
| --- | --- |
| 3,4'-Dihydroxybenzophenone | 21.4 g (0.1 mole) |
| Diphenyl terephthalate | 28.6 g (0.09 mole) |
| Diphenyl isophthalate | 3.2 g (0.01 mole) |
| KF | 0.05 g (0.0009 mole) |

The mixture in a reaction vessel was purged with nitrogen. Heat was applied and the mixture melted. Bath temperature was raised to 325° C. and phenol was rapidly evolved. Vacuum was applied after 10 minutes. Pressure was lowered from 20 mm to 5 mm in 5 minutes. Reaction was continued under vacuum for 30 additional minutes.

The resulting polymer had very good color, almost white. Inherent viscosity in PFP was 0.85.

EXAMPLE 3

Polyester from Phenylhydroquinone, Diphenyl Terephthalate, and Resorcinol

A polymer with the ingredient composition phenylhydroquinone/resorcinol/diphenyl terephthalate 45/5/50 in mole percent was prepared using KF as a catalyst for the ester exchange.

| Ingredient | Weight |
| --- | --- |
| Phenylhydroquinone | 35 g (0.188 mole, ~5% excess) |
| Resorcinol | 2.32 g (0.021 mole, 5% excess) |
| Diphenyl terephthalate | 63.6 g (0.20 mole) |
| KF | 0.1 g (0.0017 mole) |

The mixture in a reaction vessel as in Example 2 was purged with nitrogen and put into a 340° C. bath. After 6 min phenol was evolved. 30–40 ml of phenol was collected in 10–15 min. After running the reaction for a total of 20 min., vacuum was applied and was lowered to 1 mm over 10 min. The reaction was held at 1 mm for 30 min more and then cooled and bled with nitrogen to attain atmospheric pressure. The resulting polymer had an inherent viscosity in PFP of 2.55 dl/g.

EXAMPLE 4

Polyester from 4,4'-Isopropylidenediphenol and Diphenyl Isophthalate

Polymer with the ingredient composition 4,4'-isopropylidenediphenol/diphenyl isophthalate 50/50 in mole percent was prepared using CsF catalyst for the ester exchange reaction.

| Ingredient | Weight |
| --- | --- |
| 4,4'-Isopropylidenediphenol (Bisphenol "A") | 22.8 g (0.1 mole) |
| Diphenyl isophthalate | 31.8 g (0.1 mole) |
| CsF | 0.05 g (0.0003 mole) |

The mixture was placed in a reaction vessel as in Example 2, purged with nitrogen and immersed in a 230° C. bath. After 10 min phenol started to evolve (at 236° C.). A partial vacuum was started as refluxing began. The vacuum and bath temperature were gradually increased over a 30 min span. The reaction was held at 0.9 mm at a temperature of 280° C. to 320° C. for an additional 70 min. Nitrogen was bled into the system and the reaction was stopped.

The polymer had an inherent viscosity in PFP of 0.47 dl/g and formed a flexible film.

EXAMPLE 5 AND COMPARATIVE EXAMPLE 5A

Polyester from 4,4'-Isopropylidenediphenol and Diphenyl Isophthalate

Polymer with the ingredient composition 4,4'-isopropylidenediphenol/diphenyl isophthalate 50/50 in mole percent was prepared using potassium fluoride as the catalyst for the ester exchange reaction.

| | Weight | |
| --- | --- | --- |
| Ingredient | Example 5 | Example 5A |
| 4,4'-Isopropylidenediphenol | 40.0 g (0.175 mole) | 40.0 g |
| Diphenyl isophthalate | 55.8 g (0.175 mole) | 55.8 g |
| Potassium fluoride | 0.01 g | |

The above mixtures were placed in reaction vessels, each fitted with a mechanical stirrer, and a distillation head. To remove oxygen, the reaction vessels were evacuated to about 0.1 mm and brought back to atmospheric pressure with nitrogen (2 cycles). The reaction vessels were placed in a Wood's metal bath for heating. The KF catalyzed reaction was run at 260° C. for 45 minutes at 125 mm Hg and a further 45 minutes while raising the temperature to 280° C. 20 ml of phenol was evolved. The catalyzed reaction was continued at temperatures up to 330° C. while reducing the vacuum to 0.1 mm of mercury. An amorphous, light tan, viscous polymer was obtained, approx. three hours from the start. The polymer had an inherent viscosity of 0.56 dl/g. After two hours at about 260° C. with pressure reduced in stages to 40 mm of mercury, less than 6 ml of phenol came off with the control. After 5 hours at 260° C., a total of 18 ml phenol had evolved. Decomposition of the bisphenol precluded workup of polymer.

EXAMPLE 6

Polyester from Phenyl 4-Hydroxybenzoate, t-Butylhydroquinone, 4,4'-Dihydroxydiphenyl, and Diphenyl Terephthalate A polymer with the ingredient composition t-butylhydroquinone/4,4'-dihydroxydiphenyl (4,4'-diphenol)/phenyl 4-hydroxybenzoate/diphenyl terephthalate, 26.6/6.7/33.3/33/3 in mole percent, was prepared using KF as a catalyst for the ester exchange.

| Ingredient | Weight |
| --- | --- |
| t-Butylhydroquinone | 47.39 g (0.29 mole) |
| 4,4'-Dihydroxydiphenyl | 13.27 g (0.07 mole) |
| Phenyl 4-hydroxybenzoate | 76.35 g (0.36 mole) |
| Diphenyl terephthalate | 113.46 g (0.36 mole) |
| KF | 0.025 g (0.0004 mole) |

The mixture was placed in a reaction vessel and purged with nitrogen as in Example 5. The vessel was immersed in a bath at 275°±5° C. With good stirring, phenol evolution began in about 7 minutes. The pressure was reduced to 240 mm Hg and held there for 35 minutes. The pressure was further reduced in stages to 160 mm Hg over a period of 87 minutes. At this point, the bath temperature was raised to 345° C. over one hour. The pressure was then reduced to 0.1 mm Hg. The temperature and pressure were held at 345° C. and 0.1 mm to 1 mm Hg, respectively, for an additional hour. The system was returned to atmospheric pressure with nitrogen. After cooling, the polymer was removed. The polymer had an inherent viscosity of 5.0 dl/g (0.5 g/100 ml solution in p-chlorophenol/1,2-dichloroethane, 50/50 by volume).

I claim:

1. A process for preparing polyester from reactants comprising at least one aromatic diol and at least one member of the group consisting of diphenylester of an aromatic dicarboxylic acid and phenyl ester of a hydroxyaromatic acid which comprises subjecting the reactant(s) to an ester interchange reaction in the presence of a catalytic amount of an alkali metal fluoride selected from the group of cesium, rubidium, potassium and sodium fluorides.

2. A process according to claim 1 wherein the catalyst is cesium fluoride.

3. A process according to claim 1 wherein the catalyst is potassium fluoride.

4. A process according to claim 1 wherein the reactants comprise at least one aromatic diol and at least one diphenylester of aromatic dicarboxylic acid.

5. A process according to claim 1 wherein the reactants comprise aromatic diol, diphenyl ester of aromatic dicarboxylic acid, and phenyl ester of hydroxyaromatic acid.

6. A process according to claim 1 wherein 4,4'-isopropylidenediphenol is reacted with diphenyl isophthalate.

7. A process according to claim 1 wherein a mixture of t-butylhydroquinone and 4,4'-dihydroxydiphenyl are reacted with a mixture of phenyl 4-hydroxybenzoate and diphenyl terephthalate.

8. A process according to claim 1 wherein phenylhydroquinone is reacted with a mixture of diphenyl terephthalate and diphenyl isophthalate.

9. A process according to claim 1 wherein 3,4'-dihydroxybenzophenone is reacted with a mixture of diphenyl terephthalate and diphenyl isophthalate.

* * * * *